United States Patent
Grant

(10) Patent No.: US 7,637,521 B2
(45) Date of Patent: Dec. 29, 2009

(54) BRACKET TO MOUNT A STEERING ASSEMBLY

(76) Inventor: Robert William Grant, 175 Dahlia Avenue, Ottawa, Ontario (CA) K1H 6G1

( * ) Notice: Subject to any disclaimer, the term of this patent is extended or adjusted under 35 U.S.C. 154(b) by 563 days.

(21) Appl. No.: 11/171,986

(22) Filed: Jul. 1, 2005

(65) Prior Publication Data
US 2006/0022427 A1    Feb. 2, 2006

(30) Foreign Application Priority Data
Jul. 28, 2004    (CA) .................................... 2475264

(51) Int. Cl.
*B62K 21/00*    (2006.01)
(52) U.S. Cl. ........................ 280/279; 280/276; 280/278; 280/280
(58) Field of Classification Search ................. 280/276, 280/279, 280, 278
See application file for complete search history.

(56) References Cited

U.S. PATENT DOCUMENTS

| | | | | |
|---|---|---|---|---|
| 2,656,197 A * | 10/1953 | Leber | .......................... | 280/274 |
| 3,015,498 A * | 1/1962 | Tanaka et al. | ............... | 280/278 |
| 3,155,185 A * | 11/1964 | Allen et al. | ................. | 180/223 |
| 3,301,575 A * | 1/1967 | Ryan et al. | .................. | 280/275 |
| 3,866,946 A | 2/1975 | Robison | | |
| 4,147,371 A * | 4/1979 | Morita et al. | ................ | 280/276 |
| 4,268,055 A * | 5/1981 | Bell | ............................ | 280/278 |
| 4,540,189 A * | 9/1985 | Tanaka | ....................... | 280/270 |
| 4,600,207 A | 7/1986 | Zosi | | |
| 4,650,022 A * | 3/1987 | Sato et al. | .................... | 180/219 |
| 4,770,434 A * | 9/1988 | Pietro | .......................... | 280/278 |
| 5,429,381 A * | 7/1995 | Mercat et al. | ............... | 280/279 |
| 5,782,313 A * | 7/1998 | Kurawaki et al. | ........... | 180/219 |
| 5,967,538 A * | 10/1999 | Callaluca et al. | ............ | 280/279 |
| 6,517,095 B1 * | 2/2003 | Lansac et al. | ............... | 280/276 |
| 6,634,251 B2 * | 10/2003 | Chen | ............................ | 74/492 |
| 6,786,499 B2 * | 9/2004 | Ackley | ........................ | 280/276 |
| 6,973,853 B2 * | 12/2005 | Chang | ........................ | 74/551.3 |
| 2005/0012296 A1 * | 1/2005 | Wimmer | ...................... | 280/279 |
| 2006/0113745 A1 * | 6/2006 | Lagar | ........................... | 280/279 |

FOREIGN PATENT DOCUMENTS

GB    570439    7/1945

* cited by examiner

*Primary Examiner*—Joanne Silbermann
*Assistant Examiner*—Maurice Williams

(57) ABSTRACT

A bracket attaches rigidly to the steering head tube member at the front of a motorcycle frame, so that the fork steering assembly can be relocated and pivotally attached to the front of the bracket. This bracket permits the fork steering assembly to be mounted in a new position which is ahead of, and higher, or lower than its former, manufacturer's specified position. The steering axis can be positioned such that it is tilted at a greater angle of inclination from the vertical, permitting use of longer fork tubes. The bracket permits any motorcycle to be reversibly modified to have the appearance and handling characteristics of a chopper style motorcycle. No modifications to the motorcycles frame are needed, in order to relocate the fork steering assembly. Thus, the originality and value of the motorcycle, if the owner decides to, later, revert to the original appearance, is maintained.

6 Claims, 6 Drawing Sheets

BRACKET TO MOUNT A STEERING ASSEMBLY

This application claims the benefit of the filing date of a Canadian application having application number 2475264 which was filed on Jul. 28, 2004 in Canada.

BACKGROUND OF THE INVENTION

1. Field of the Invention

The present invention pertains to a vehicle, such as a motorcycle, or even a bicycle, having a frame with a pivotally attached steering assembly, sometimes termed a fork assembly, as may be seen in FIG. 1. The steering assembly 2 typically consists of two parallel telescoping fork tubes 10, rigidly attached near their top ends to two triple trees 30, or clamping plate assembly. The steering assembly also consists of a front wheel 3 rotatably mounted on a front axle. The front axle is located transversely between the two fork tubes 10, near their bottom ends. Handlebars, a front fender, a braking mechanism, dampers, headlight, and a locking mechanism may be part of the steering assembly 2.

A frame head tube 6 is a tubular structural member at the vehicle's frame front portion 14. The frame head tube 6 is typically rigidly attached, by welding, to a frame top tube 25 and a frame down tube 26. Frame head tube 6 has a throughbore having a head tube axis 7. The head tube axis 7 is coaxial with, and thus defines, a steering axis 8. The throughbore contains bearings which receive a fastener such as threaded pin 29. Pin 29 is coaxial with the frame head tube axis 7 and the steering axis 8. Pin 29 also passes through the triple tree 30 component of the steering assembly. The steering assembly 2 pivots on the pin 29 about the steering axis 8, thus providing a steering function, so that an operator may steer the vehicle.

The steering axis 8 is a straight line coplanar with a vertical longitudinal plane, and is also inclined rearward with respect to a vertical line 22. The angle between the steering axis 8 and a vertical line 22 is called a steering inclination angle 23. The steering inclination angle 23 is arranged such that the steering axis 8 intersects the ground in front of the point at which the front tire contacts the ground. The horizontal dimension between these two points is called trail, and results in steering stability. The wheelbase of the vehicle is the horizontal distance between the point at which the front tire contacts the ground, and the point at which the rear tire, mounted on a rear wheel 4, contacts the ground.

Instead of telescoping fork tubes 10, the steering assembly 2 may include various, known in the art, springer or girder types of articulated linkage mechanisms, with springs and dampers, to support the front wheel 3.

2. Description of the Prior Art

Many motorcycle operators wish to relocate the steering assembly, in order to alter the steering geometry by changing the steering inclination angle 23. Many operators also wish to lengthen the wheelbase, to lower the motorcycle, to use longer fork tubes, in order to alter the function, or the appearance, of the motorcycle.

The most common method for relocating the steering assembly and steering axis, of a vehicle such as a motorcycle, is to first disassemble the steering assembly from its pivoting attachment at the motorcycle's frame head tube. Then the motorcycle's frame is completely severed, or chopped off, just rearward of the frame head tube, such that the frame head tube is completely detached from the remaining portion of the frame. Then, the frame head tube can be relocated, by rotation and or translation, in the vertical longitudinal plane, to a desired new position and angle, and then welded back onto the remaining portion of the frame, using small wedges of metal to form strengthening gussets. The steering assembly, or forks, can then be reinstalled onto the relocated frame head tube. This well established method, the typical results of which are illustrated in FIG. 2, is known as chopping a motorcycle. Chopping has several disadvantages, including the need for major disassembly of at least the front portion of the motorcycle, because the welding step can adversely affect, by melting, nearby wiring and electrical components. The cutting and welding can be a fire hazard, and may also damage any nearby painted or chromed surfaces. Precision alignment jigs and fixtures are preferably used to ensure proper alignment of the steering axis so that it remains within the vertical longitudinal plane. The resulting modification to the motorcycle's frame is permanent. Any error in alignment of the steering axis will result in misalignment of the steering, possibly causing unwanted erratic handling characteristics. Such alignment errors may include not maintaining the steering axis in a vertical longitudinal plane. After the cutting and welding has been accomplished, reassembly of every component which needed to be removed is then required, as is repainting of at least the front of the frame and head tube. If the welds are inadequate, catastrophic frame structural failure, during subsequent use of the motorcycle, is known. This chopping method does have the very desirable benefit of providing a relocated fork assembly having any desired steering inclination angle. The resulting chopper style motorcycle, usually having a steering axis more horizontally inclined than that of an unmodified motorcycle, permits use of longer fork tubes. Choppers are, however, very distinctive in appearance and can be very desirable, and may have very stable handling characteristics due to an increased trail dimension. However, the cost, effort, and specialized fabrication and measurement tools required to perform this modification discourages many motorcyclists from doing so. The traditional cutting and welding of the motorcycle's frame also discourages many owners of antique, brand new, or otherwise valuable motorcycles, from performing this irreversible modification.

U.S. Pat. No. 3,866,946 provides a mechanism for the adjustment of the steering angle by use of a cylindrical member rotatably mounted within the frame head tube. The steering axis is eccentric, forming an angle with respect to the axis of the cylindrical member. Rotation of the cylindrical member, with respect to the head tube, causes the steering axis to move, and thus alters the steering axis angle of inclination. The diameter of the head tube must be manufactured to be larger than normal, as the adjustment of the steering axis angle is limited by the eccentricity of the steering axis. The eccentricity is limited by the angle formed between the steering axis and the axis of the cylindrical member. This angle is, in turn, limited by the inside diameter of the head tube. It also is difficult to align the steering axis so that it remains in a vertical, longitudinal plane. Installation of such a mechanism in a motorcycle not specifically designed to accept this arrangement, is not feasible, as the eccentricity is restricted by the diameter of the cylindrical member, which has to fit within the head tube. No forward, nor vertical translation, or relocation, of the steering axis is possible.

U.S. Pat. No. 4,600,207 describes a multi piece linkage type connection mechanism between a specifically manufactured fork assembly and a specifically fabricated motorcycle frame, such that the angle of the steering axis can be adjusted, even while riding the motorcycle. The motorcycle's frame has no integral head tube, and the frame must be specifically manufactured or configured such that the mechanisms, including eccentrics and linkages, can be used. Installation on an unmodified motorcycle having a head tube defining a steering axis, is not possible.

British Patent 570439 discloses an arrangement where the fork assembly can tilt, while being constrained near its upper end by means of a plate having a slot which is oriented in a longitudinal direction. The angle of inclination of the steering axis can be adjusted by tilting the fork assembly, and then constraining the fork assembly by means of a threaded fastener passing through the elongated slot. The fork assembly and frame must be manufactured to include these various specific components. This method of altering the angle of inclination of the steering axis cannot be used with an unmodified motorcycle frame and fork assembly, and would require extensive permanent modifications to be made to any conventional motorcycle. The plate rigidly attaches to the steering fork, and does not rigidly attach to the head tube portion of the motorcycle's frame. The steering fork does not provide its steering function by pivoting, or steering, with respect to the plate. The arrangement does not relocate a steering axis to be in front of a former steering axis.

It is sometimes desirable to be able to relocate the steering axis, and thus relocate the steering assembly, of a vehicle such as a motorcycle. This cannot be accomplished without firstly designing and fabricating the motorcycle frame to provide for an adjustable steering axis, or performing extensive irreversible modifications to the motorcycle's existing frame members. What is needed, and is not found in prior art, to solve the problem of how to easily and reversibly relocate the steering axis, is a novel and convenient apparatus. Not having to cut and modify the motorcycle, and being able to subsequently revert to an original steering angle configuration, would also be desirable.

SUMMARY OF THE INVENTION

The object of the invention is to provide a bracket structure which mounts to the front of a motorcycles's frame, and which permits a relocation of the position of the front wheel steering assembly.

The invention is a bracket to permit relocation of the steering assembly of any vehicle which has a frame and a steering assembly pivotable about a steering axis.

This can be accomplished by providing a novel bracket, which comprises;

front bracket means for pivotally attaching to the steering assembly;

rear bracket means for rigidly attaching to a front portion of the vehicle's frame; and bracket middle means for connecting the front bracket means to the rear bracket means, wherein the bracket is adapted to provide a new steering axis about which the steering assembly pivots, to provide the steering function for the vehicle.

DESCRIPTION OF THE PREFERRED EMBODIMENTS

Figure 1:
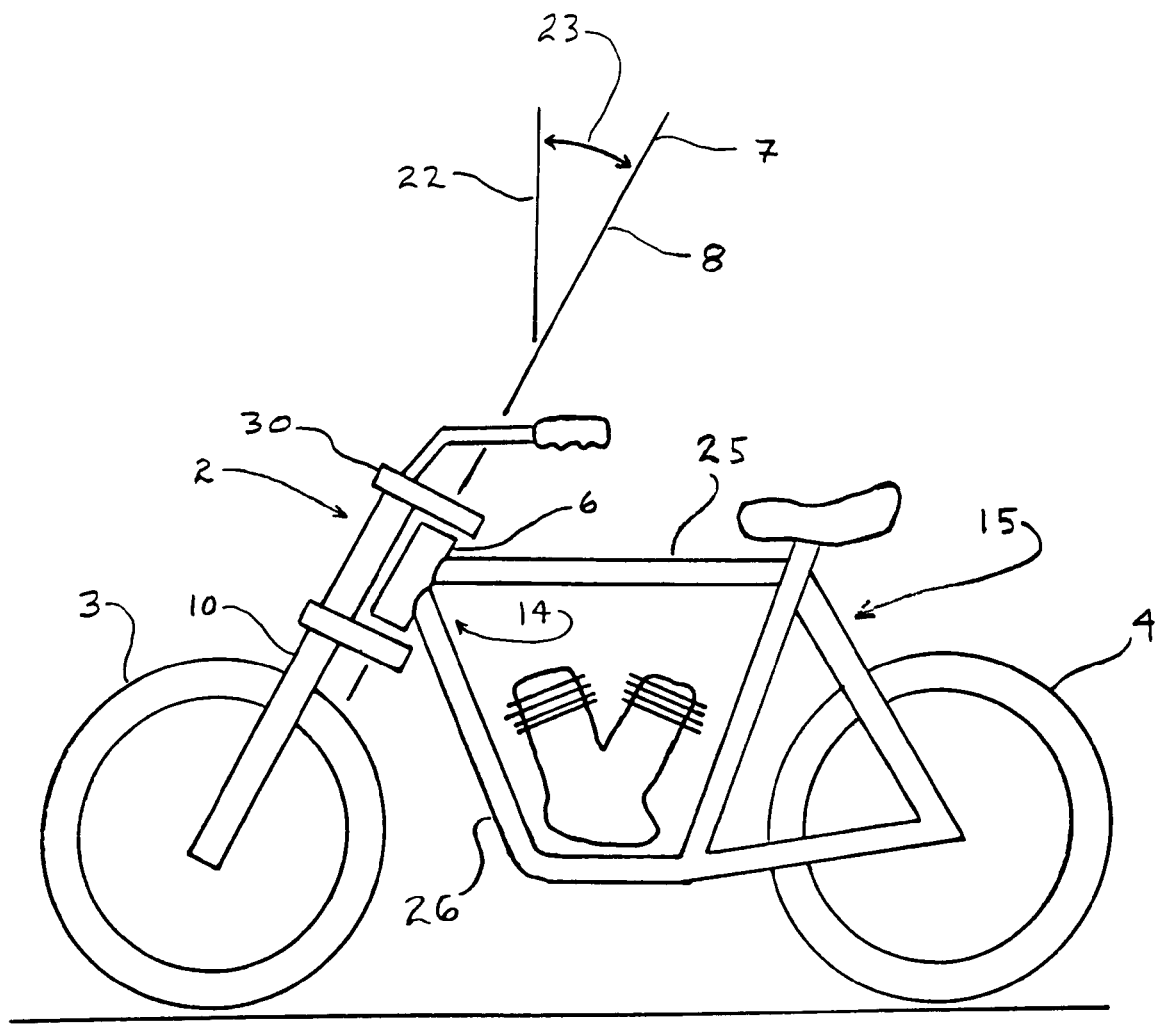
FIG. 1 is prior art, a left side view of a motorcycle type vehicle, having a steering assembly and a steering axis.
Figure 2:
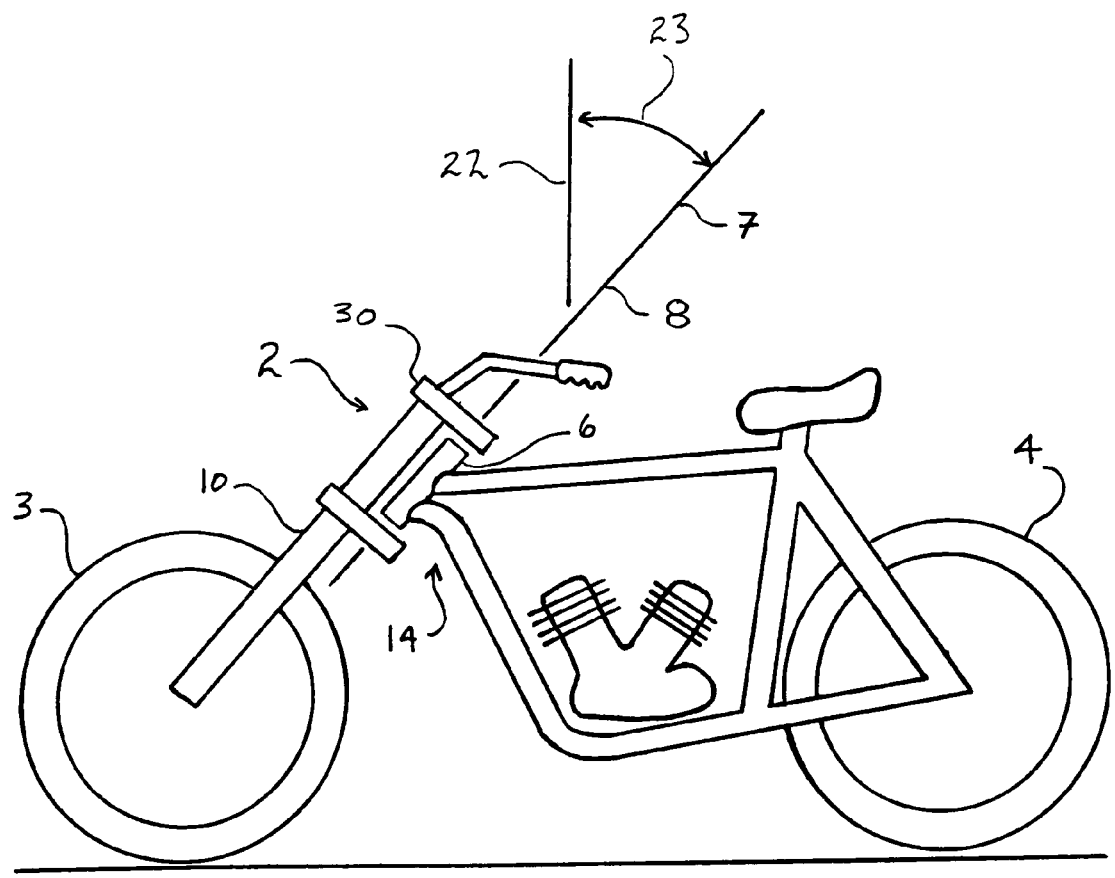
FIG. 2 is prior art, a left side view of a motorcycle type vehicle, with the vehicle's frame modified in the area where the steering head tube attaches to the top tube and down tube, to provide a new steering axis.
Figure 3:
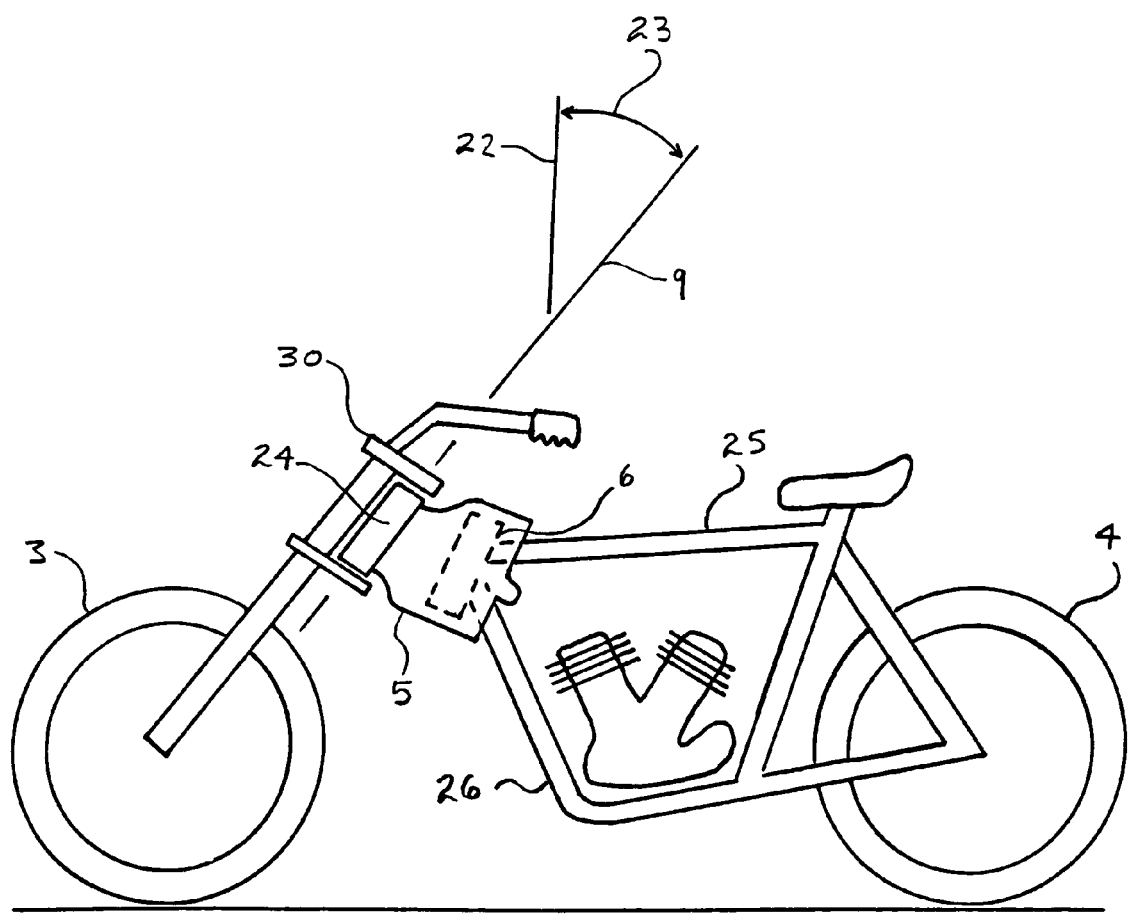
FIG. 3 is a left side view of a motorcycle type vehicle, showing the first preferred embodiment of the bracket installed, providing a new steering axis.
Figure 4:
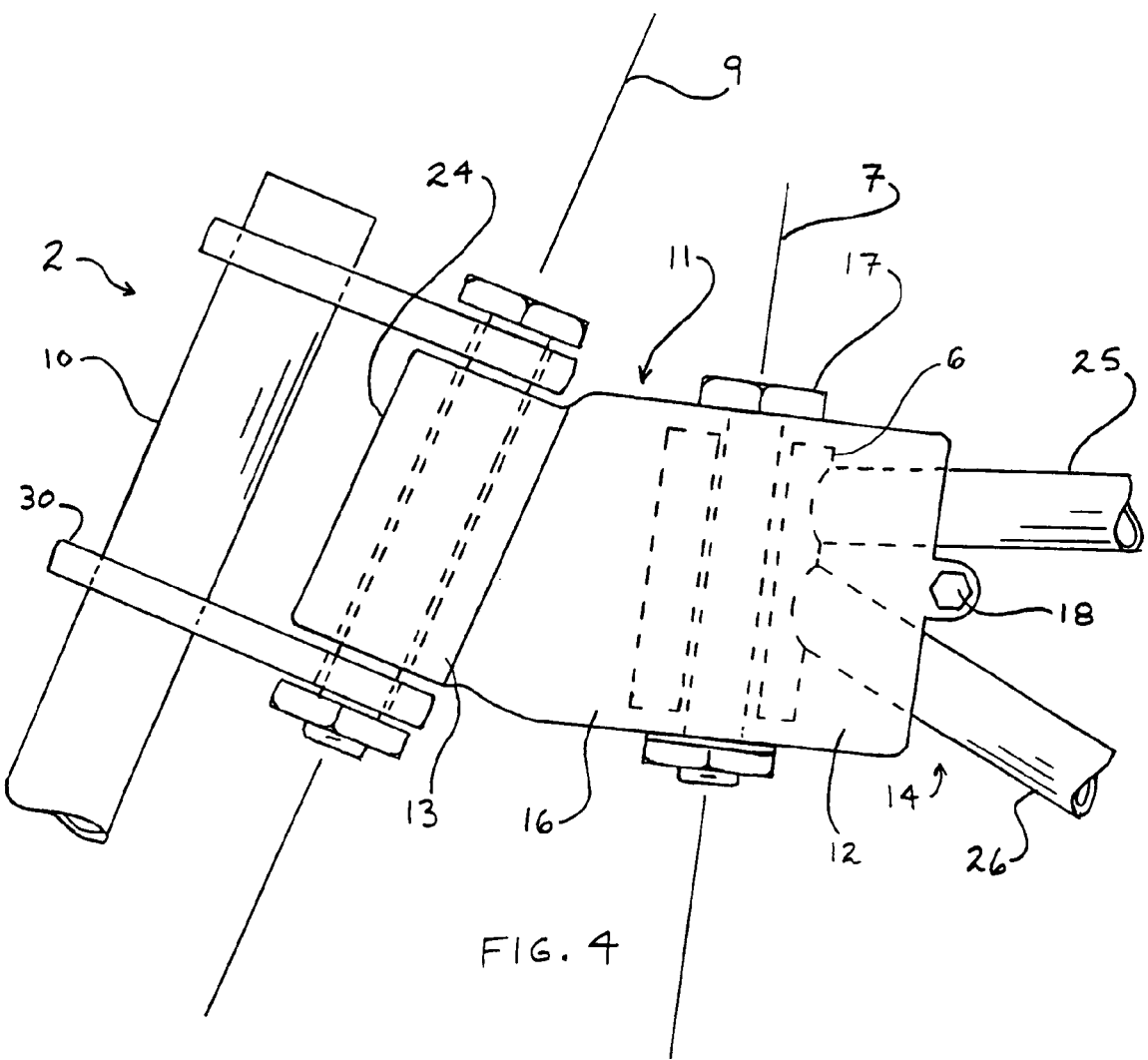
FIG. 4 is a left side view, showing detail of the first preferred embodiment of the bracket as installed on a vehicle, and showing portions of the vehicle's frame and steering assembly.
Figure 5:
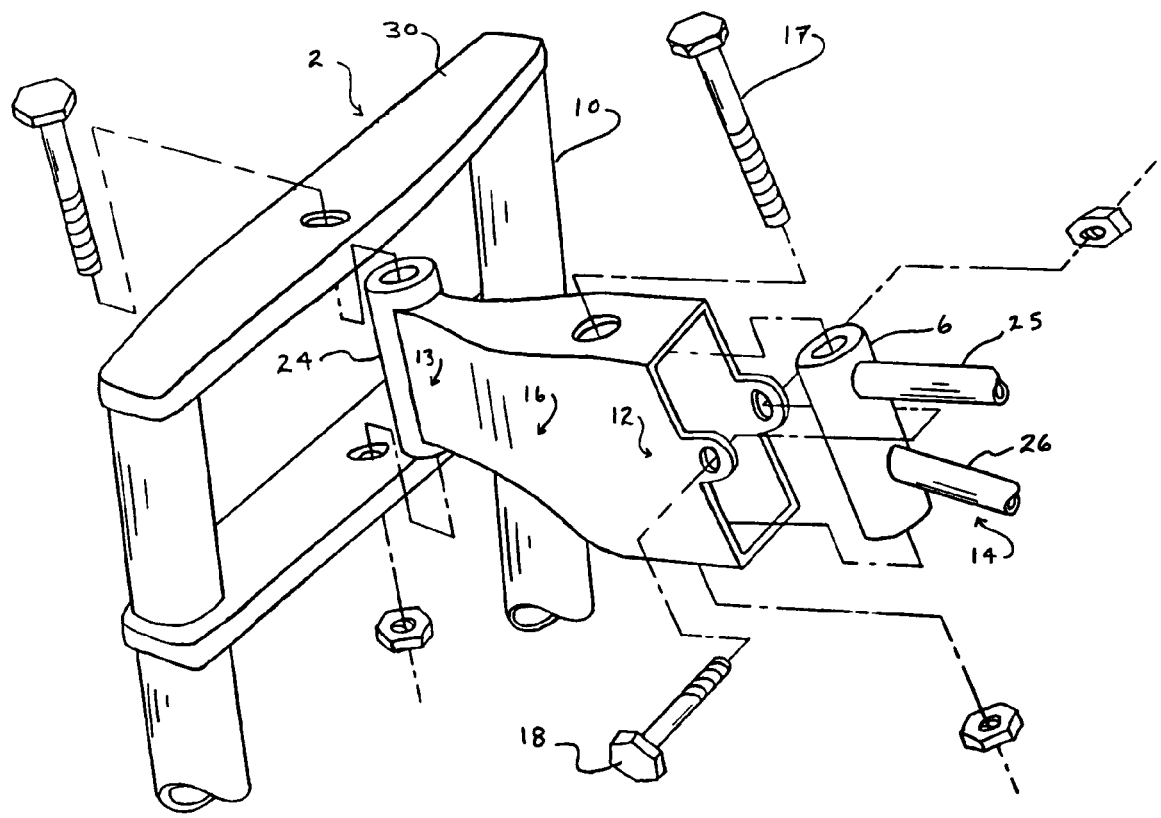
FIG. 5 is a perspective view, from upper left, showing the bracket and portions of the vehicle's frame front portion, portions of the steering assembly.

A first preferred embodiment may be represented by FIGS. 3, 4 and 5. The first preferred embodiment comprises a rigid bracket 5, consisting of a bracket front portion 13, a bracket middle portion 16, and a bracket rear portion 12. The bracket front portion 13 is a means to pivotally attach to the existing steering assembly 2, to thereby provide the steering function. The bracket rear portion 12 serves as a means for the bracket to receive and rigidly attach to the vehicle's frame front portion 14, and/or to the frame head tube 6. The bracket middle portion 16 serves to connect the bracket front portion 13 to the bracket rear portion 12.

To use the bracket 5, first the steering assembly 2 including triple tree 30 assembly, is temporarily removed from its pivotal attachment to the frame head tube 6, at the front portion 14 of the frame 15 of the motorcycle. The frame may have a top tube 25 and one or more down tubes 26 which are rigidly connected to the frame head tube 6, all forming the front portion 14 of the frame 15. The bracket rear portion 12 is shaped to receive and attach rigidly to the frame head tube 6, and optionally also to attach to the front portion 14 of the frame 15. A bolted connection such as using bolts 17 and 18, may be used, or set screws, rivets or even welding, if a permanent installation is desired. The bracket front portion 13 is constructed in such a way as to provide a new head tube 24, thus defining a new steering axis 9 at a location which is in front of the frame head tube 6. The steering assembly 2 can now be pivotally attached to the new head tube 24, such as by means of a fastener such as pin 29. Bearings or bushings, which permit the steering assembly 2 to pivot or rotate with respect to the new head tube 24 are well known, and are not shown, may be used. The steering assembly 2 now pivots about the new steering axis 9, thus providing the steering function. The bracket middle portion 16 serves to rigidly connect the bracket front portion 13 to the bracket rear portion 12, so that the new steering axis 9 can be in front of, and, if desired, be at a different angle of inclination from the vertical, as compared with the steering head tube 6 which defines the former frame steering axis 8. The new steering axis 9 is at a steering inclination angle 23, with respect to a vertical line 22. The new steering axis 9 may also be slightly above, or below, the height of the former frame steering axis 8 position. If desired, extended fork tubes 10 may be used in the steering assembly 2. The new steering axis 9 may be arranged to intersect the ground at a point in front of a point at which the front wheel 3 contacts the ground, to provide steering stability.

Figure 6:
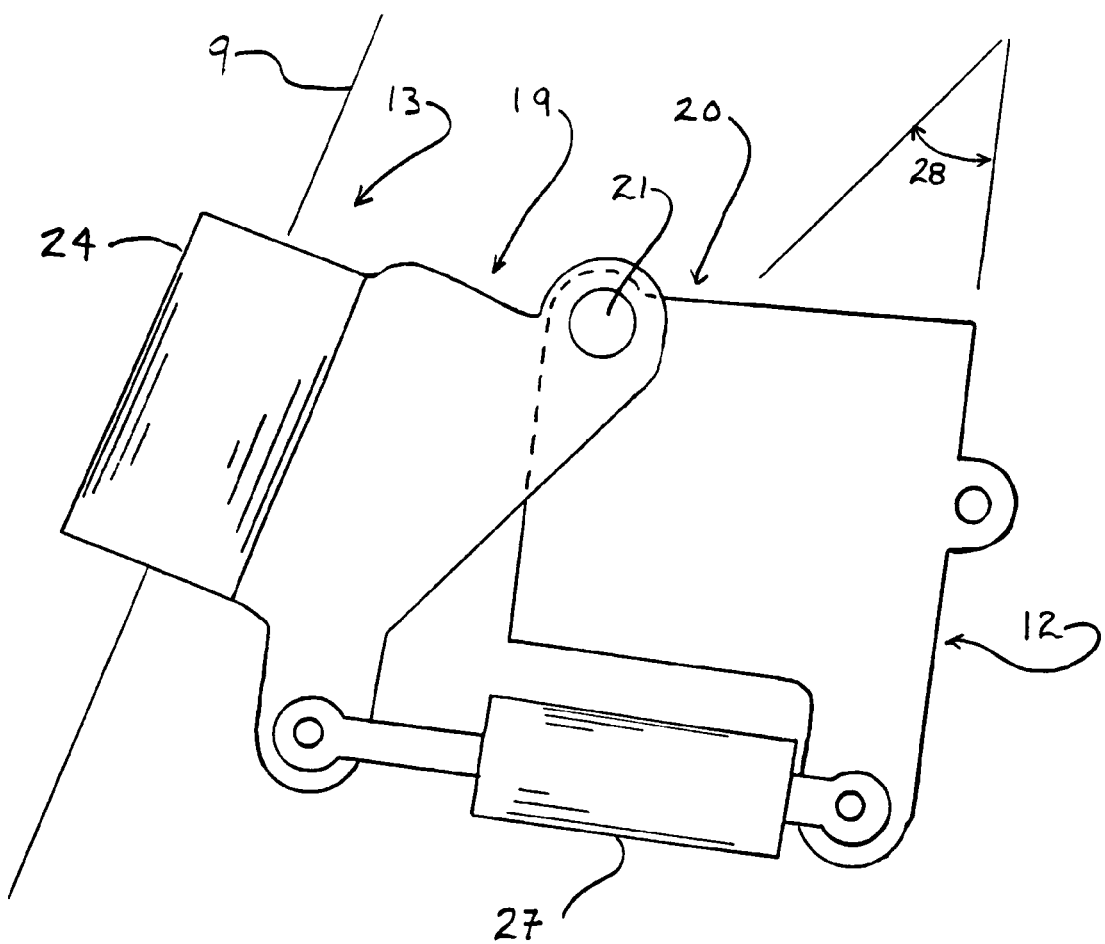
FIG. 6 is a left side view, of the second preferred embodiment of the bracket, the two portions of the bracket may be adjusted relative to one another, resulting in adjustability of the new steering axis.

A second preferred embodiment, as represented by FIG. 6, also comprises a bracket 5 having a bracket front portion 13, a bracket middle portion 16, and a bracket rear portion 12. The bracket rear portion 12 is a means for rigidly attaching the bracket 5 to the front portion 14 of the vehicle's frame 15, at the frame head tube 6 region, after the steering assembly 2 has been temporarily removed from the existing frame head tube 6. The bracket front portion 13 is a means for providing a new steering axis 9, such as a new head tube 24. The steering assembly 2 pivotally attaches to the bracket front portion 13, for example using fastener 29, and bearings which are not shown, thus providing the steering function. The bracket middle portion 16 is a means for pivotally and adjustably connecting the bracket front portion 13 to the bracket rear portion 12. The bracket middle portion 16 comprises two components: a mid front portion 19 and a mid rear portion 20, pivotally connected to one another about a transverse horizontal axis 21, and forming an adjustment angle 28. The two piece construction of the bracket middle portion permits relative angular movement, about the transverse horizontal axis 21, between the bracket front portion 13 with attached steering assembly 2, and the bracket rear portion 12, which is rigidly attached to the motorcycle's frame 15. This will permit adjustability of the steering inclination angle 23, in the vertical longitudinal plane, when desired by the operator. This also permits a reversible, operator controlled, lowering of the front portion of the motorcycle, and a lengthening of the wheelbase. A means for adjusting and controlling the adjustment angle 28 between the bracket front portion 13, and the bracket rear portion 12, may be an actuator 27. The actuator 27 may be any kind of extensible device connected to both the bracket front portion 13 and the bracket rear portion 12, so that activation of the actuator 27 causes the two bracket portions (13, 12) to controllably rotate, about the horizontal transverse axis 21, with respect to one another, thus varying the adjustment angle 28 and the steering inclination angle 23. The actuator 27, or actuators, may be any kind of well known mechanical devices such as threaded rods, linear actuators, rotary actuators, electrical, mechanical, hydraulic or pneumatic devices, controllable by the operator. The actuator 27 resists forces acting to cause the bracket front portion 13 and the bracket rear portion 12 to rotate with respect to one another about the horizontal axis 21, and thus permits the operator to adjust the adjustment angle 28, and to also maintain angle 28 at a selected constant value. The actuator includes any necessary linkages, hydraulic or pneumatic tubing, pumps, fluid reservoirs, wiring, fuses and control devices and switches. The new steering axis 9 may be in front of, and higher than, or lower than the former frame steering axis 8 position. Extended fork tubes 10 may also be used in the steering assembly 2, to provide a distinctive appearance to the motorcycle.

The new steering axis 9 may be arranged to intersect the ground at a point in front of the point at which the front tire contacts the ground, thus providing steering stability.

The present invention may be used so that a lengthened steering assembly, which may be in the form of extended fork tubes, may be substituted for the original manufacturer's steering assembly. The steering assembly may comprise any type of well known telescopic fork tubes, extended fork tubes, a girder assembly consisting of mechanical links, or a springer type of steering assembly consisting of mechanical articulated linkages with springs. Dampers may dampen unwanted wheel oscillations. The vehicle may be any well known vehicle such as a motorcycle, a three wheeled motorcycle, a tricycle, or a bicycle, or any vehicle having a steering assembly pivoted about a steering axis located near the front of the vehicle's frame.

I claim:

1. A bracket for attaching a steering assembly to a frame of a cycle vehicle, the steering assembly including a handlebar and a single front axle which supports a single front wheel; before an installation of the bracket on the cycle vehicle the steering assembly pivots about a first steering axis allowing an operator to steer the vehicle, the first steering axis being in a vertical longitudinal plane and being defined by a single head tube at a front of the frame; the bracket is installed on the single head tube at the front of the frame after removal of the steering assembly from the single head tube thereby rendering the first steering axis to be non-functional; the bracket comprising:

front bracket means which pivotally attaches to the steering assembly, the front bracket means defining and providing a new steering axis;

rear bracket means for rigidly attaching directly to the single head tube at the front of the frame; and middle bracket means for connecting said front bracket means to said rear bracket means, wherein said middle bracket means is further defined as comprising;

a bracket middle front portion for attaching to said front bracket means, and a bracket middle rear portion for attaching to said rear bracket means, wherein said bracket middle front portion and said bracket middle rear portion are pivotally connected to one another, and said bracket middle front portion and said bracket middle rear portion pivot with respect to one another about a horizontal transverse axis, wherein relative positions of the bracket middle front portion and the bracket middle rear portion define an adjustment angle, and an actuator which adjusts and controls said adjustment angle;

wherein said bracket provides the new steering axis about which the steering assembly pivots after the bracket is attached rigidly and directly to the head tube at the front of the frame thereby providing a steering function for the vehicle allowing the operator to steer the cycle vehicle, the new steering axis eliminating the first steering axis and the new steering axis being in the vertical longitudinal plane.

2. The bracket of claim 1, wherein the steering assembly is selected from a group consisting of a telescoping fork tube steering assembly, a girder steering assembly, a non-telescoping bicycle front fork, and a steering assembly comprising articulated mechanical linkages with springs.

3. The bracket of claim 1, where said vehicle is selected from a group consisting of a motorcycle, a tricycle, a bicycle, and a three wheeled motorcycle.

4. The bracket of claim 1, wherein said actuator is selected from a group consisting of a hydraulic cylinder, a linear actuator, an electrical linear actuator, a pneumatic cylinder, a rotary actuator, a screw thread mechanism, and a mechanical linkage; and wherein the actuator includes a control mechanism to control and vary the adjustment angle.

5. The bracket according to claim 1, wherein the new steering axis is disposed to intersect the ground at a point in front of a point at which a front tire of said vehicle contacts the ground.

6. A cycle vehicle to which the bracket defined by any one of claims 1 to 5 is attached, the cycle vehicle being selected from a group consisting of a motorcycle, a tricycle, a bicycle and a three wheeled motorcycle; the steering assembly being selected from a group consisting of a telescoping fork steering assembly, a non-telescoping bicycle front fork, a girder steering assembly and a steering assembly comprising articulated mechanical linkages with springs.

* * * * *